United States Patent

Duggal

[11] Patent Number: 5,906,340
[45] Date of Patent: May 25, 1999

[54] INFLATABLE ESCAPE SLIDE ASSEMBLY

[75] Inventor: Virinder Duggal, Woodinville, Wash.

[73] Assignee: The B.F. Goodrich Company, Richfield, Ohio

[21] Appl. No.: 08/865,198

[22] Filed: May 29, 1997

[51] Int. Cl.[6] .............................. B64C 1/22; A62B 1/20; B65G 11/10
[52] U.S. Cl. .................... 244/905; 244/137.2; 182/48; 193/25 B
[58] Field of Search ................ 244/137.2, 905; 182/48; 193/25 B

[56] References Cited

U.S. PATENT DOCUMENTS

| | | | |
|---|---|---|---|
| 3,102,623 | 9/1963 | Schacht et al. | 244/905 X |
| 3,669,217 | 6/1972 | Fisher | 182/48 |
| 3,712,417 | 1/1973 | Chacko | 182/48 |
| 3,811,534 | 5/1974 | Fisher | 244/905 X |
| 3,860,984 | 1/1975 | Fisher | 244/905 X |
| 4,013,247 | 3/1977 | Giffin | 244/905 X |
| 4,441,582 | 4/1984 | Ward, Jr. | 182/48 |
| 5,301,630 | 4/1994 | Genovese et al. | 244/905 X |
| 5,360,186 | 11/1994 | Danielson et al. | 244/137.2 |

FOREIGN PATENT DOCUMENTS 214404  8/1957  Australia ................ 244/905

*Primary Examiner*—Charles T. Jordan
*Assistant Examiner*—Theresa M. Wesson
*Attorney, Agent, or Firm*—Joseph Januszkiewicz

[57] ABSTRACT

An escape slide and life raft assembly for evacuating personnel from an aircraft, with the slide having side tubes and cross tubes along with a slide panel that extends the full length of the slide. The slide has a head end and a toe end with one of the cross tubes located at the head end defining a head end tube. A girt, secured to the aircraft, has a quick release connection to the escape slide that is actuated by a lanyard, which lanyard is also connected to a plurality of releasable straps which provide support to the slide while it is being inflated. Such releasable straps are located at the head end of the slide and interconnect the head end tube and the side tubes to the girt.

15 Claims, 5 Drawing Sheets

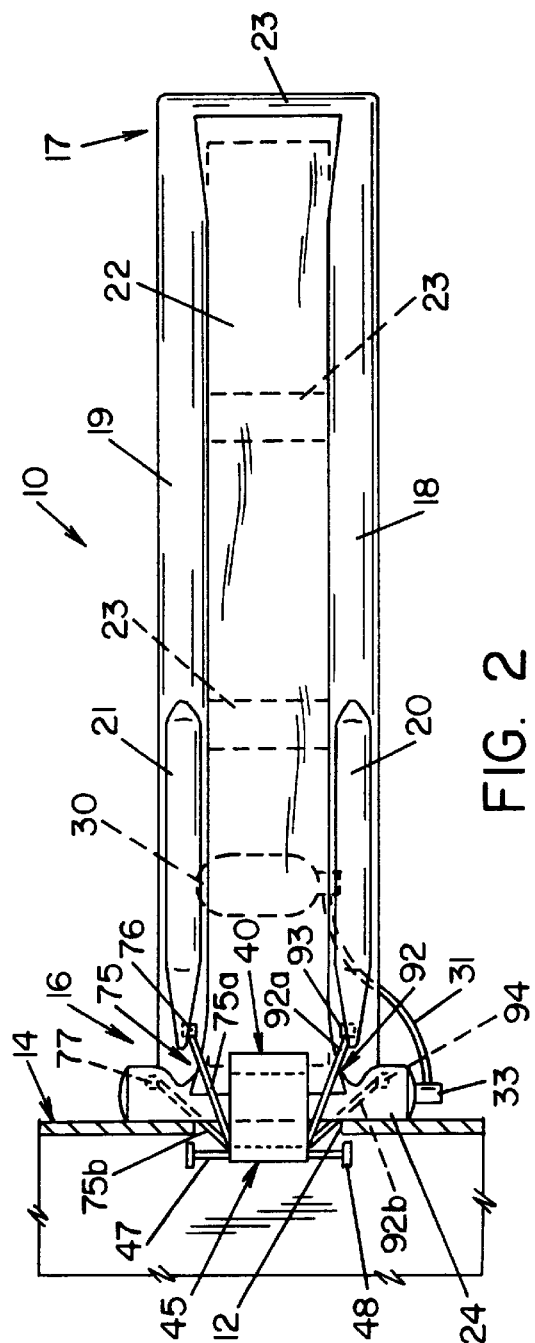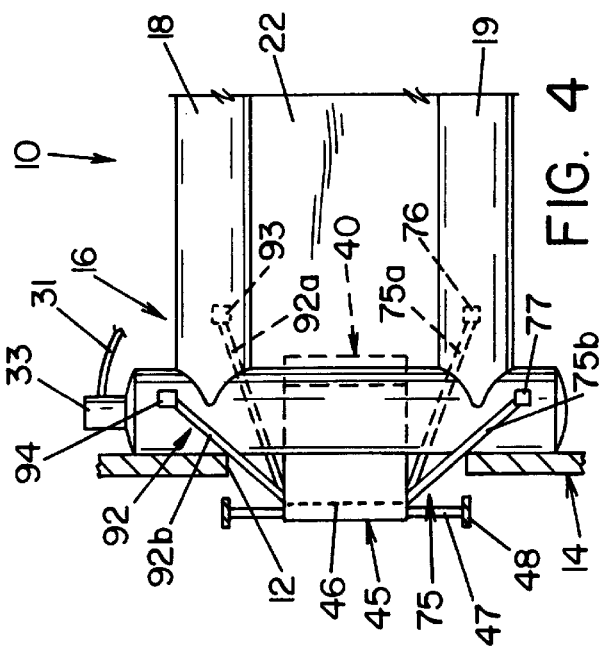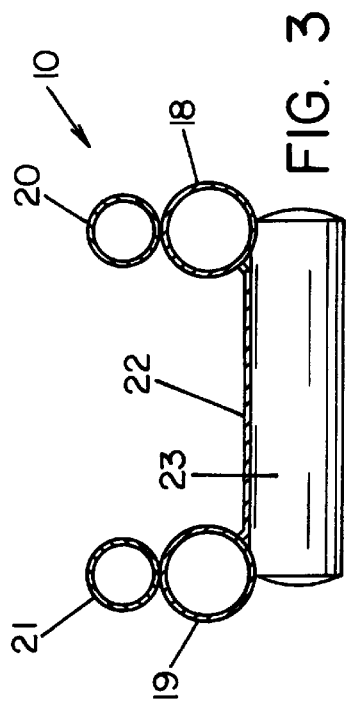

INFLATABLE ESCAPE SLIDE ASSEMBLY

BACKGROUND OF THE INVENTION

This invention relates to an inflatable escape slide and more particularly to an improved aircraft inflatable escape slide raft assembly with releasable stabilizer straps that support the head end of the escape slide in its deployment from an aircraft.

Escape slides employed in aircraft emergency situations, such as aborted take offs and emergency landings where it is necessary to evacuate passengers and the crew immediately, it is necessary to deploy the escape slide in the correct attitude under adverse weather conditions including strong winds. In these weather circumstances, the slide can be twisted by the winds rendering it useless as where a portion of the slide is skewed under the aircraft thereby preventing its proper deployment.

The present invention is directed to the use of stabilizing straps that interconnect the head end of the escape slide raft assembly, which receives the initial inflating fluids, to the adjacent aircraft girt support to stabilize the slide during deployment under adverse wind conditions. The straps maintain the head end of the slide properly against the side of the airplane and prevents such head end from dipping during the inflation process in the strong winds. In addition the straps as placed and interconnected to transfer all the load into the girt bar. These stabilizer straps are detachable from the airplane and the girt after inflation simultaneously by a single lanyard that also releases the escape slide from its interlocking quick release connection to the aircraft thus permitting the escape slides use as a life raft.

SUMMARY OF THE INVENTION

This invention relates to an escape slide that has releasable stabilizer straps that stabilize the head end of an escape slide when deployed from the body of an airplane and such stabilizer straps and interlocking means such as the quick release means between the slide and the aircraft body are released simultaneously thus permitting the escape slide to be separated from the aircraft body for use as a raft.

BRIEF DESCRIPTION OF DRAWINGS

FIG. 2 is a top plan view of the slide shown in FIG. 1;

FIG. 3 is a sectional view of the slide shown in FIG. 1, taken along a line 3—3 thereof;

FIG. 4 is a fragmentary view of the underside of the head end portion of the escape slide showing stabilizer straps extending from the girt to the head end and main tube members;

DETAILED DESCRIPTION

Figure 1:
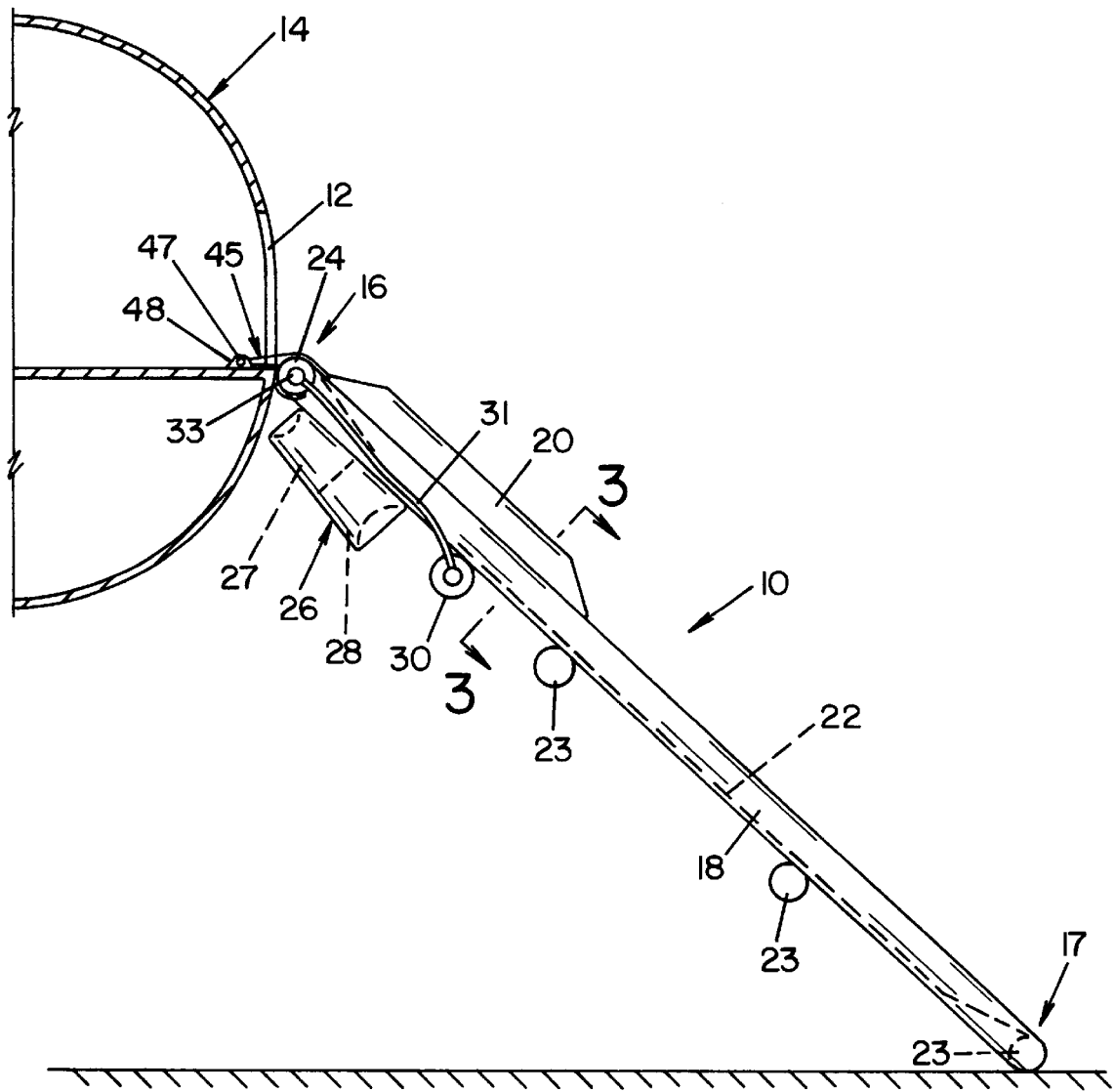
FIG. 1 is a side elevation of a fully deployed inflatable escape slide formed in accordance with the present invention in a position in which it may extend from an aircraft.

Referring to the drawings, wherein like reference numerals designate like or corresponding parts throughout the several views, there is shown in FIGS. 1 and 2 an inflatable escape slide 10 deployed from an egress door 12 of an aircraft 14. The escape slide 10 is a conventional slide that is deployed through the egress door 12 during a period of on ground emergency to provide for the rapid evacuation of passengers and crew members.

The escape slide 10 includes a head end 16 and toe end 17, with the entire escape slide 10 fabricated from a fabric or other suitable material coated with an elastomer or a suitable plastic. The various parts are joined together with a suitable adhesive whereby the composite structures communicate with each other and preclude air flow out from the various chambers and tubular members during operation in the inflated states.

The escape slide 10 is a multi-tubular construction having a pair of laterally spaced longitudinally extending inflatable side tubes or tubular members 18 and 19, and a pair of laterally spaced shorter length inflatable guide tubes or guide tubular members 20 and 21. The guide tubes 20 and 21 are mounted and physically adhered onto the upper surface of side tubes 18 and 19 at the head end portion of the escape slide. The side tubes 18 and 19 are also referred to as main tubes. The guide tubes 20 and 21 function as guide rails adjacent the head end of the slide to provide support for the evacuees entering the slide 10. Such tubes 20 and 21 may extend for the full length of the main tubes and are suitably bonded thereto. Each pair of inflatable tubes or tubular members 18 and 19 and the guide tubes 20 and 21 respectively are spaced apart from one another and are interconnected by a reinforced fabric sheet 22 that is stretched between the two interfaces between the guide tubes and for the full length of the laterally spaced main tubes 18 and 19 to form a sliding surface for the evacuation of passengers from the airplane. The main tubes 18 and 19 are interconnected by a plurality of inflatable cross support tubes 23, which help to maintain the inflated escape slide in a deployed or extended condition for use as a slide. The number and location of the cross support tubes 23 is a matter of design and are shown to illustrate their use. The upper most cross tube located at the head end of the slide is referred to as a head end tube 24 for convenience and is slightly longer in length and extends laterally beyond the main tubes 18 and 19.

Located on the underneath section of each of the main tubes 18 and 19 adjacent the head end of the slide is a stabilizer support tube assembly 26, with only one of these support tube assembly or positioning tubes being shown and described, it being understood that both tubes 26 act the same and are structurally the same. The positioning or support tube assembly is composed of two compartments 27 and 28 that act as a positioning tube to aid in the deployment of the slide. Compartment 27, the first compartment or primary chamber, is located closer to the head end tube 24 and the aircraft 14, while compartment 28 is further down from the head end 16 of the slide 10. The adjacent abutting surfaces of the escape slide 10 and the positioning tube or tube assembly 26 are suitably bonded together, with compartments 27 and 28 communicating with the interior of the main tube via an opening between compartment 27 and the main tubes 18 and 19.

A suitable source of pressurized gas or air, such as a bottle or container 30 of pressurized gas, is mounted on the underside of slide 10, which bottle 30 is connected via a conduit 31 to an aspirator 33 located on the side portion of the head end tube 24, and is operative to inflate tubes 18 through 24 and the positioning tube 26. Additional containers of pressurized gas, aspirators and conduits or any combinations of pressurized gas, aspirators and conduits or any combination of them may be used. Suitable valve means on conduit 31 or the aspirator 33 controls the pressurization of the inflatable tubes as via a lanyard by a crew member or automatically with the deployment of the slide 10 from the egress door 12 of the aircraft.

The uppermost portion or the head end of slide 10 has a panel 40, which may be formed as a single fabric panel or a pair of panels, that extends from the head end tube 24 of the inflatable tube assembly and is provided at its end with a plurality of apertures 41 (FIG. 7) which may be provided with suitable grommets. A complimentary panel or girt 45, which has a seam 46 sewn at the mid-section of the panel 45 provides a tunnel or passageway 44 (FIGS. 4 and 5) in which is located a girt bar 47 that is received in brackets 48 suitably attached to the aircraft. A plurality of fabric loops 50 are fastened to one end of the panel 45 and a like number of apertures 51 are formed in the opposite ends of such panel 45.

The ends of the panel 45 are positioned over the end of panel 40 and the fabric loops 50 are passed through apertures 41 in panel 40 and coaxially located apertures 51 in the opposite end of panel 45. Each outboard loop is then threaded over the adjacent loop, which is then threaded over the loop adjacent to it, etc. Working inwardly from each side until two loops 50 from the respective opposite sides are threaded over the central loop, and a pin 52 is then passed through the central loop to lock all of the loops together and firmly fastens the panel 40 to the panel of girt 45. This is referred to as a speed lacing and is old and well known in the art. A fabric panel 53, as seen in FIG. 5 overlies and protects the speed lacing during evacuation of passengers.

The girt bar 47 which holds the panel 45 is fastened to the aircraft and when the door is opened during an emergency, suitable means, not shown, actuate a suitable valve which directs the pressurized air from the bottle of compressed gas or air 30 via conduit 31 through the aspirator 33 to inflate the inflatable tubes of the slide 10.

Figure 6:
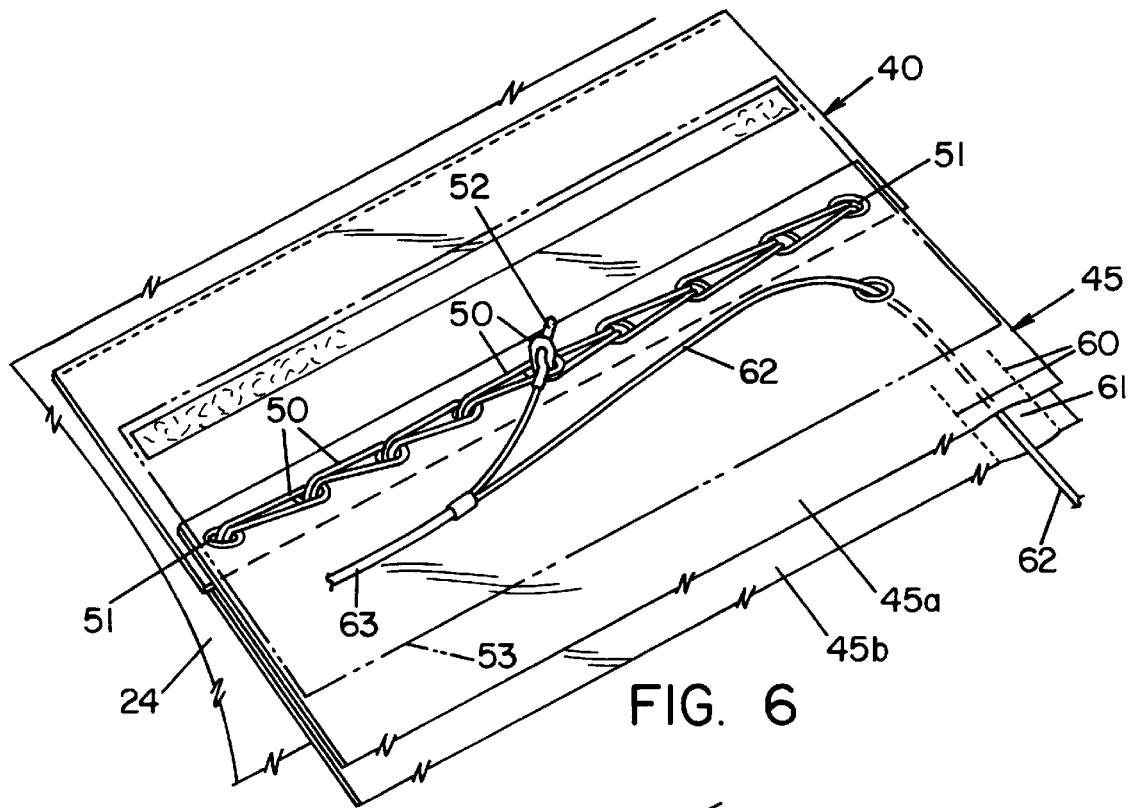
FIG. 6 is a perspective illustration of the quick release or speed lacing connecting the girt end to a fabric ply of the slide.
Figure 7:
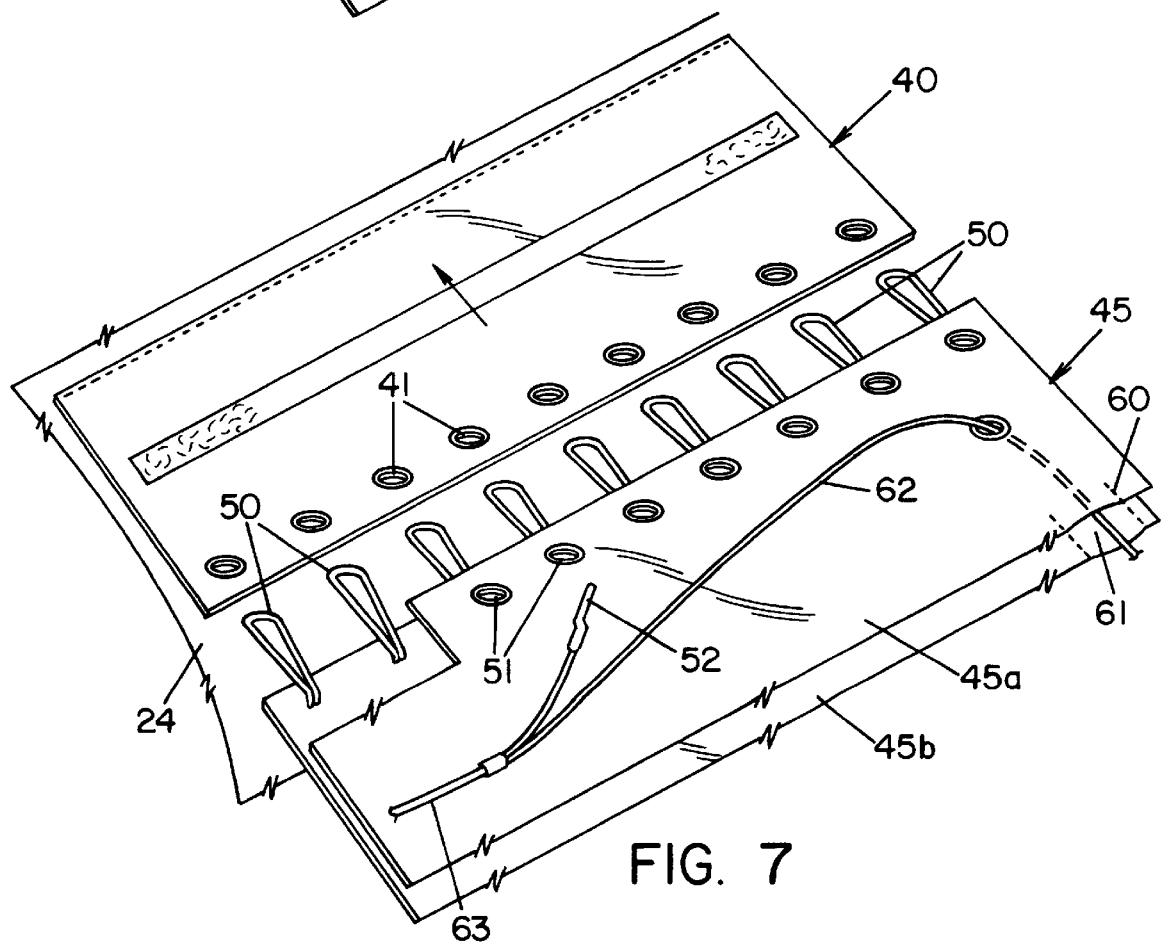
FIG. 7 is a view showing the speed lacing of FIG. 6 in the released condition.

Panel or girt 45 has a top ply 45a (FIGS. 5 and 7) and a lower ply 45b to provide a tunnel to be described. As viewed in FIG. 5 seems 60 are sewn across the far right portion to create a tunnel 61 which as seen in FIG. 5 runs vertically and receives a girt stabilizer lanyard 62. The lanyard 62 extends out of a grommet at the top end of such top ply and is connected (as shown in FIG. 5) to a girt release lanyard 63 to permit a single lanyard to control the release of the escape slide from the girt. As seen in FIGS. 6 and 7 the lanyards 63 and 62 are connected to the pin 52 which controls the release of the speed lacing, which speed lacing was described earlier. The pulling on the girt release lanyard 63 will release the speed lacing and effect the separation of the escape slide from the girt and the airplane.

Figure 5:
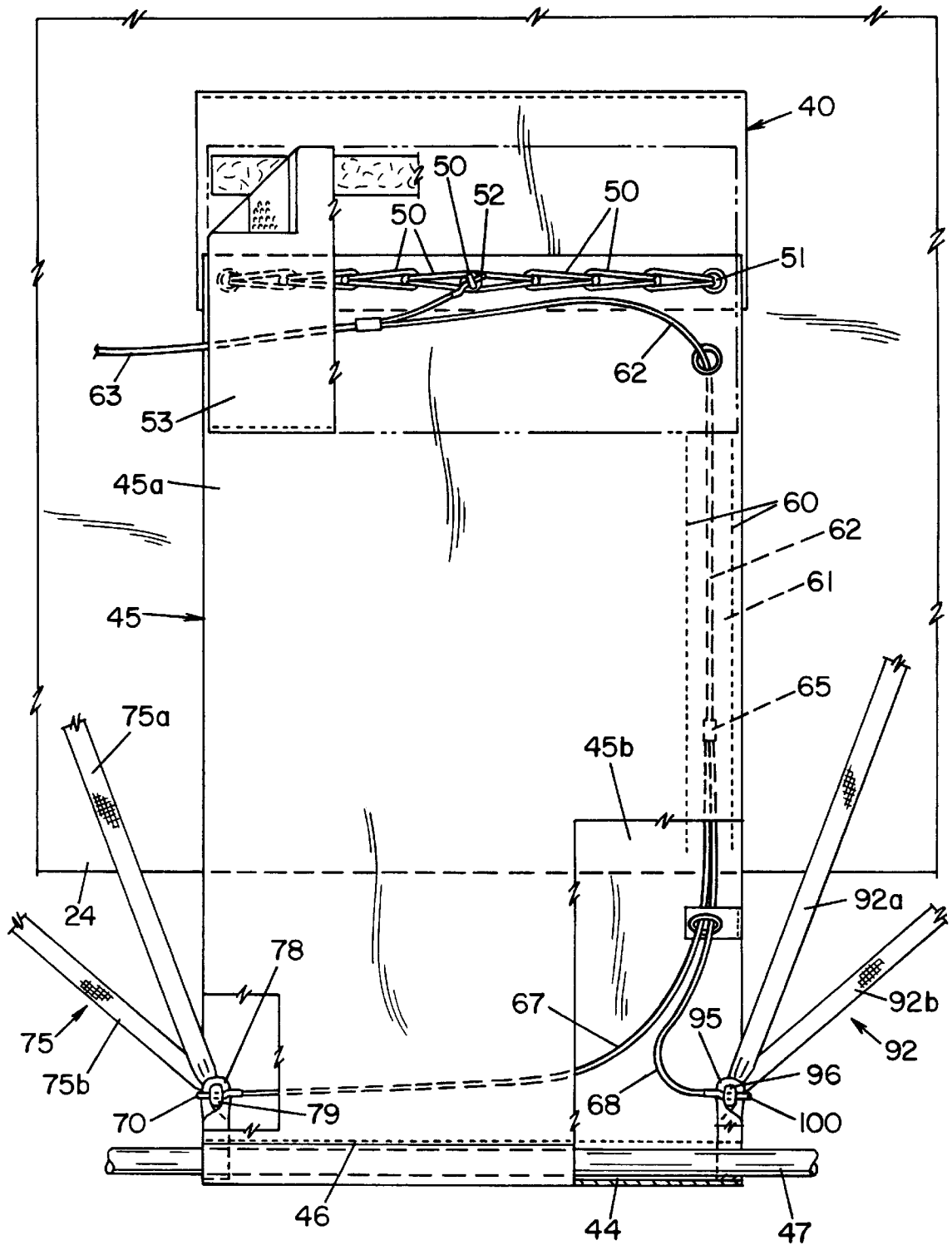
FIG. 5 is a plan view of the girt with the girt stabilizer system.

The girt stabilizer release lanyard 62 extends downwardly as viewed in FIG. 5 to a fastener 65 to which is press fitted to the ends of two lanyards or ropes 67 and 68. Lanyard 67 is a long lanyard and extends to the left side of the panel 45 as viewed in FIG. 5 where a pin 70 is suitably connected or press fitted on the end thereof.

Figure 8:
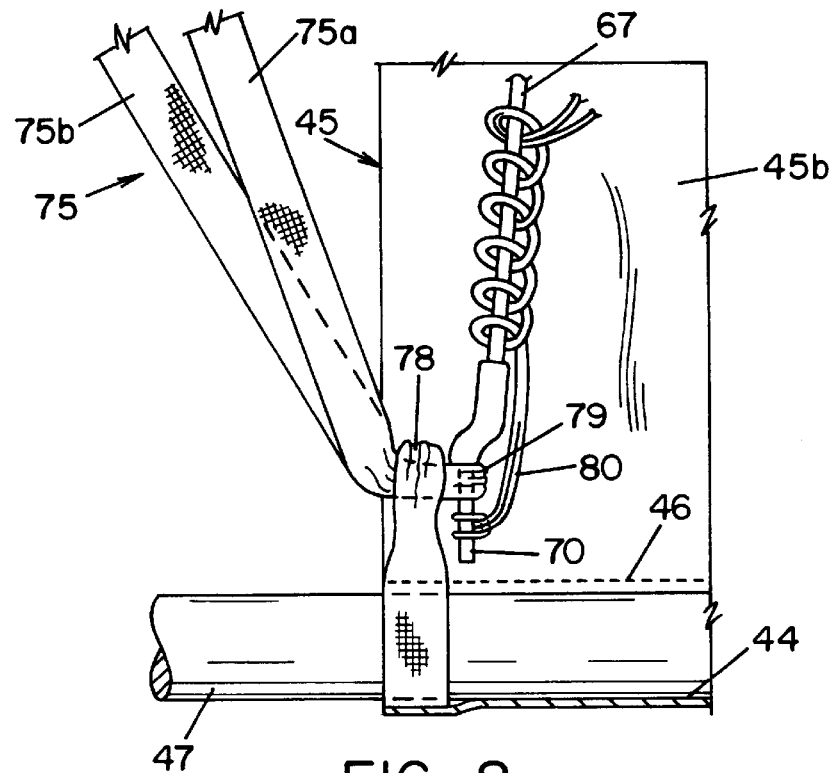
FIG. 8 is an enlarged fragmentary view of the connection of the stabilizer straps and the girt bar.
Figure 9:
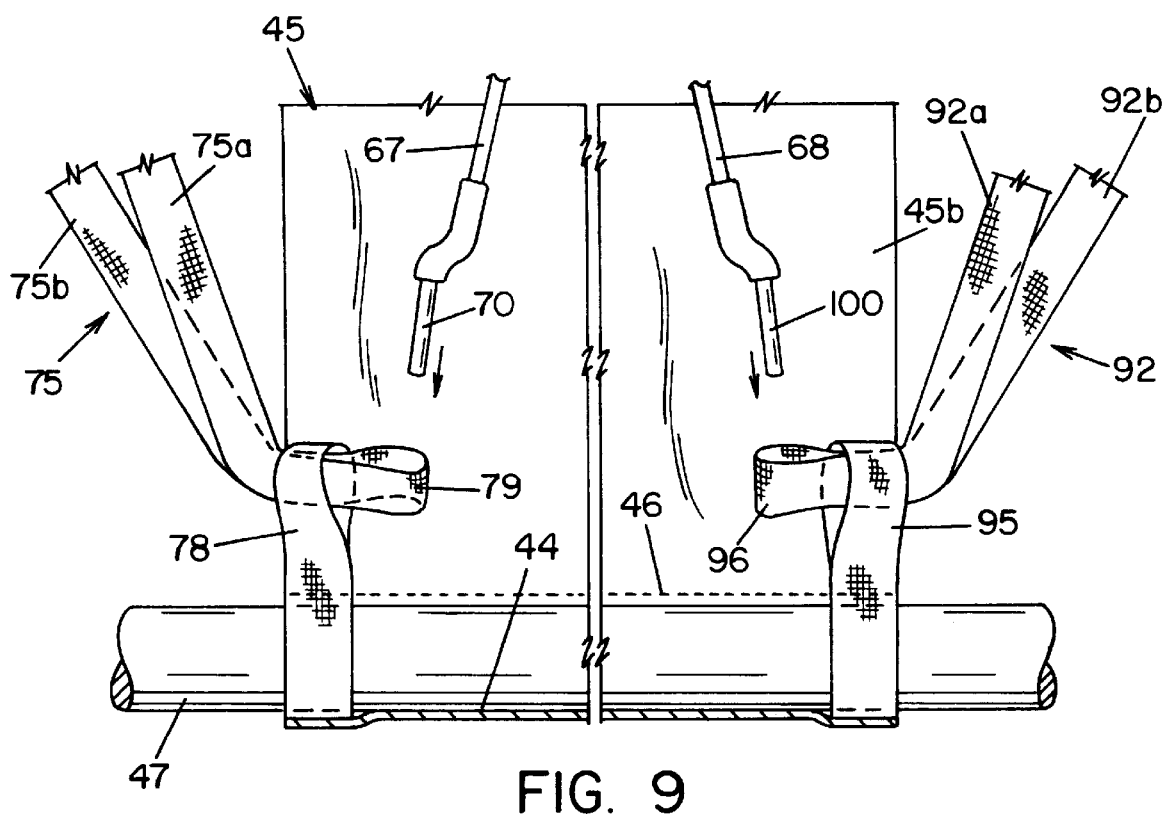
FIG. 9 is a fragmentary view of the rearward portion of the girt illustrating the connection of the stabilizer straps mid portion just prior to the connection with the release pins.

Located on each side of the panel 45 are girt stabilizer straps. As viewed in FIG. 5, a stabilizer strap 75 is located on the left side of the girt 45 and has one end secured as by a patch 76 to the top portion of the main tube 19. This portion of the strap 75 is designated 75a and is also refereed to as a top stabilizer strap. The other end of the stabilizer strap 75 is secured as by a patch 77 to the bottom end portion of head end tube 24 and is referred to as the lower stabilizer strap 75b. As seen in FIG. 2, stabilizer straps 75a and 75b are fastened to one side of the head end of the escape slide. The respective top stabilizer strap 75a and the lower stabilizer strap 75b extend towards the girt bar 47 and since it is a single strap, the approximate mid-portion of this strap is fed into a loop 78 secured to girt 45 near one end of tunnel 44 (that receives the girt bar 47) and which then provides its own loop 79 as depicted by FIG. 9 so as to received pin 70 of girt stabilizer release lanyard 67. A breakable safety tie 80 using cotton thread as seen in FIG. 8 helps to retain the pin 70 in the loop and is readily breakable by pulling on lanyard 67.

As viewed in FIG. 5, a stabilizer strap 92 is located on the right side of the girt 45 and has one end secured as by a patch 93 to the top portion of the main tube 18. this portion of the strap 92 is designated 92a and is also referred to as the top stabilizer strap. The other end of stabilizer strap 92 is received and secured as by a patch 94 to the bottom other end portion of head end tube 24 and is referred to as the lower stabilizer strap 92b. As seen in FIG. 2, stabilizer straps 92a and 92b are fastened to the other side of the head end of the escape slide. The respective top stabilizer strap 92a and the lower stabilizer strap 92b extend towards the girt bar 47 and since it is a single strap, the approximate middle portion of the entire strap is fed into a loop 95 secured to girt 45 near the other end of tunnel 44 (that receives the girt bar 47) and which then provides its own loop 96 as depicted by FIG. 9 so as to receive pin 100 of the girt stabilizer release lanyard 68. A suitable breakable safety tie (not shown) helps to retain the pin 100 in the loop as disclosed and described on pin 70. The pulling of the girt stabilizer release lanyard 63 and consequently lanyards 67 and 68 will release the pins 70 and 100 from the loops 78 and 95 and thus allow the respective stabilizer straps 75 and 92 to be released from the girt 45 when the girt release lanyard 63 is pulled for this purpose.

As thus described girt release lanyard 63 is operative when pulled to simultaneously pull pins 52 (which releases the speed lacing between panels 40 and the girt 45) and pins 70 and 100 (which releases the girt stabilizer straps 75 and 92 from the girt), thus completely separating the escape slide and the stabilizer straps from the aircraft 14 while providing during deployment the additional lateral support to the escape slide 10. In addition these stabilizer straps prevent the head end of the slide from moving away from the side of the aircraft body and further prevents the head end of the slide from dipping down during inflation under windy conditions. These straps effectively transfer their full load to the girt bar which is suitably braced and secured to the aircraft.

It should be understood, that the foregoing disclosure relates to only a preferred embodiment of the invention and that numerous modifications or alterations may be made therein without departing from the spirit and the scope of the invention as set forth in the appended claims.

We claim:

1. An aircraft life raft escape slide assembly for use from an egress door of an aircraft comprising an assembly of at least two inflatable side tubes and two inflatable transverse tubes, said slide having a head end and a toe end, said head end being located adjacent said egress door of said aircraft, one of said transverse tubes being a head end tube and located adjacent said egress door upon deployment of said escape slide, a strip of flexible material secured to said tubes to define a slide surface, a girt means secured to said aircraft having a releasable connection to said head end tube, a lanyard connected to said releasable connection and operative upon actuation to release said escape slide from said girt means, pressurizing means operative upon actuation to inflate all of said tubes, flexible stabilizer strap members interconnecting said girt members to opposite ends of said head end of said slide to stabilize said slide while transferring load stresses to said girt means, and release means interconnecting said stabilizer strap members to said lanyard and operative to release said strap members from said girt members upon actuation of said lanyard which completely releases said escape slide from said aircraft.

2. An aircraft life raft escape slide assembly as set forth in claim 1 wherein said strap members consists of an upper strap member located on each side of said slide, and a lower strap member located on each side of said slide.

3. An aircraft life raft escape slide assembly as set forth in claim 2 wherein said upper strap members are connected to opposite top portions of said side tubes, and said lower strap members are connected to opposite end portions of said head end tube.

4. An aircraft life raft escape slide assembly as set forth in claim 3 wherein said head end tube extends laterally beyond each side of said slide defining two spaced remote end portions on said head end tube, and said lower straps being connected to the bottom portions of said remote end portions.

5. An aircraft life raft escape slide assembly as set forth in claim 4 wherein the respective upper strap members and said lower strap members on each side of the slide are a one piece strap that has its intermediate portion releasably secured to a release pin operatively connected to said lanyard.

6. An aircraft life raft escape slide for use from an egress door of an aircraft comprising at least a pair of inflatable side tubes and a pair of cross tubes, said slide having a head end and a toe end, one of said cross tubes is a head end tube located at said head end of said slide, a slide panel member fastened to said tubes to provide a slide surface for the evacuation of passengers from said egress door of said aircraft, pressurized inflation means mounted on said slide and operative upon actuation to inflate said tubes, a fabric panel located at the upper end of said slide and secured thereto, a girt panel interconnected to said fabric panel by a quick release means, a lanyard means mounted on said slide and connected to said quick release means that is operative upon actuation to release said slide from said girt panel, and releasable stabilizer straps interconnecting said girt panel to said head end of said slide and said head end tube to stabilize said escape slide.

7. An aircraft life raft escape slide as set forth in claim 6 wherein said stabilizer straps consists of a strap on each side of said slide to stabilize both sides of said slide.

8. An aircraft life raft escape slide as set forth in claim 7 wherein said stabilizer strap on each side of said slide has an upper strap portion and a lower strap portion.

9. An aircraft life raft escape slide as set forth in claim 8 wherein said head end tube extends laterally beyond each side of said slide to define two spaced ends, and said lower strap portions are secured to said respective lower ends of said head end tube.

10. An aircraft life raft escape slide as set forth in claim 9 wherein said upper strap portions are secured to the upper portions of said side tubes adjacent said head end of said slide.

11. An aircraft life raft escape slide as set forth in claim 10 wherein said girt panel is connected to said aircraft by a girt bar, said girt panel having a pair of laterally spaced loops defining a primary pair of loops, and said strap on each side of said slide having a loop defining a secondary pair of loops, and removably pins releasably securing said secondary loops to said primary loops.

12. An aircraft life raft escape slide as set forth in claim 11 wherein said pins are secured to ropes that are connected to said lanyard means for actuation to remove said pins and release said straps from said girt panel while simultaneously actuating said quick release means to separate said straps and escape slide from said girt panel.

13. An aircraft life raft escape slide assembly for use from an egress door of an aircraft comprising an assembly of at least two inflatable side tubes and two inflatable transverse tube, said slide having a head end and a toe end, said head end being located adjacent said egress door, one of said transverse tubes being a head end tube that is located adjacent said egress door upon deployment of said escape slide, a strip of flexible material secured to said tubes to define a slide surface, girt means secured to said aircraft and having a releasable connection to said head end tube, a positioning tube mounted on the bottom of said head end portion of said slide and operative upon inflation to aid in the deployment of said escape slide, pressurizing means operative upon actuation to inflate all of said tubes, flexible stabilizer strap members releasably secured to said girt means, said flexible stabilizer strap members being secured to said head end of said escape slide while transferring stress and load from said escape slide to said girt means, lanyard means are operative upon actuation to release said escape slide and said strap members from said girt means to free said escape slide from said girt means and aircraft, said head end tube having laterally spaced end portions that extend laterally beyond each side of said side tubes, said strap members has a pair of straps on each side of said head end of said slide, each of said pair of straps having a bottom strap and a top strap, each of said top straps having one end secured to the top portion of said side tubes, and each bottom straps secured to the bottom of said end portions of said head end tube to transfer their load to said girt means and said aircraft while holding said head end of said escape slide in position for deployment.

14. An aircraft life raft escape slide for use from an egress door of an aircraft consisting of at least two longitudinally extending inflatable side tubes and at least two inflatable transverse tubes, a slide panel member fastened to said tubes to provide a slide surface for said escape slide, said slide having a head end and a toe end, said head end located adjacent said egress door of said aircraft, one of said transverse tubes being a head end tube and located adjacent to said egress door upon deployment of said slide, pressurizing means mounted on said slide and operative upon actuation to inflate said tubes of said slide, a girt bar mounted on said aircraft adjacent to said egress door, a girt panel secured to said girt bar, quick release means interconnecting said girt panel to said head end of said slide, a stabilizer strap member on each side of said girt panel, each of said strap members having a releasable connection to each side of said girt panel, each of said stabilizer strap members secured to said head end of said slide, and release means operative upon actuation to simultaneously activate said quick release means and said releasably connections to free said escape slide from said girt panel.

15. An aircraft life raft escape slide as set forth in claim 14 wherein each of said stabilizer strap members have an upper strap portion and a lower strap portion, said upper strap portions are secured to the respective top portions of said side tubes and said lower strap portions are secured to the respective bottom portions of said head end tube to provide spaced stabilization to said escape slide.

* * * * *